United States Patent

Hirata

[11] Patent Number: 5,920,557
[45] Date of Patent: Jul. 6, 1999

[54] RADIO BASE STATION INTER-STATION SYNCHRONIZING CIRCUIT

[75] Inventor: Masaru Hirata, Tokyo, Japan

[73] Assignee: NEC Corporation, Tokyo, Japan

[21] Appl. No.: 08/871,937

[22] Filed: Jun. 10, 1997

[30] Foreign Application Priority Data

Jun. 10, 1996 [JP] Japan .................................... 8-146929

[51] Int. Cl.$^6$ .................................................. H04J 3/16
[52] U.S. Cl. ...................... 370/350; 370/324; 370/508; 370/509; 370/512; 455/502; 375/356
[58] Field of Search .................................. 370/321, 324, 370/347, 350, 337, 442, 503, 508, 509, 510, 511, 512, 513, 514; 375/356; 455/502

[56] References Cited

U.S. PATENT DOCUMENTS

| 5,519,710 | 5/1996 | Otsuka | 370/350 |
| 5,537,685 | 7/1996 | Matsuno | 370/350 |
| 5,680,421 | 10/1997 | Shiino et al. | 370/350 |
| 5,722,080 | 2/1998 | Kondo | 370/350 |

FOREIGN PATENT DOCUMENTS 3-224325 10/1991 Japan .
7-284148 10/1995 Japan .

Primary Examiner—Chi H. Pham
Assistant Examiner—Frank Duong
Attorney, Agent, or Firm—Sughrue, Mion, Zinn, Macpeak & Seas, PLLC

[57] ABSTRACT

A radio base station inter-station synchronizing circuit is disclosed that is provided in a radio base station device of a TDMA digital mobile communication system and that synchronizes the frame timing generated by each radio base station. The synchronizing circuit includes: data reception/comparison circuit 4 that outputs data match signal S9 when synchronizing signal data transmitted from a synchronized timing control station provided in a mobile communication system match with the same synchronizing signal data held by that radio base station; delay time correction counter 5 that, upon receiving the data match signal S9, subtracts from the timing of the received synchronizing signal data line delay time from the synchronized timing control station to that radio base station; timing holding circuit 8 that holds the corrected synchronized timing; and frame timing generation circuit 9 that generates and outputs frame timing from the output pulse of the timing holding circuit 8.

3 Claims, 2 Drawing Sheets

RADIO BASE STATION INTER-STATION SYNCHRONIZING CIRCUIT

BACKGROUND OF THE INVENTION

1. Field of the Invention

The present invention relates to a TDMA digital mobile communication system such as a Personal Handyphone System (PHS).

2. Description of the Related Art

In TDMA (Time Division Multiple Access) digital mobile communication systems of the prior art, neighboring radio base stations each use a frequency selected by each radio base station for transmitting and receiving, and the timing of transmission and reception used by these radio base stations is mutually asynchronous. As a result, a plurality of radio base stations will sometimes transmit at the same frequency and at the same timing, thereby giving rise to frequency interference. When such instances of frequency interference occur, transmission must be switched to another time slot, to another frequency, or to another radio base station, or alternatively, transmission must be temporarily halted in order to avoid this frequency interference.

FIG. 1 is provided for illustrating matching and non-matching between synchronous timing between radio base stations. Here, (a), (b), and (c) each show transmission and reception time slots T1, T2, T3 . . . and R1, R2, R3 . . . for radio base stations A, B, and C, respectively. All of the frequencies used at this time are $f_1$, and the timing at radio base stations A and B coincide entirely while the timing at radio base stations B and C are shifted with respect to each other. The mobile stations that communicate with base stations A, B, and C are further synchronized to the timing of the corresponding base station.

In such a case, when radio base stations B and C are adjacent to each other, radio base station B transmits in time slot T3, and radio base station C transmits in time slot T2, a time slot distinct from that of radio base station B. In this case, radio base stations B and C transmit asynchronously, and therefore, may transmit at identical or overlapping timing even though different time slots are employed, thereby giving rise to frequency interference on the side of the corresponding mobile stations. However, frequency interference will not occur, even between neighboring slots, if synchronization is established as for radio base station A and radio base station B. In other words, at the same frequency, effective use is enabled for any time slot.

The prior art suffered from the drawback that, because the timing of transmitted and received radio waves was asynchronous for each radio base station, the occurrence of frequency interference necessitated switching to another slot or switching to another frequency, thereby delaying transmission and reception and preventing effective communication.

To deal with the above-described drawback, measures have been taken such that each radio base station is synchronized to a prescribed timing. For example, in Japanese Patent Laid-open No. 224325/91, one control station measures in advance the delay time of signal transfer to each radio base station, and then coordinates such that timing pulses transmitted from the control station to each radio base station are simultaneously received at each radio base station and a frame generation circuit in each radio base station is reset. As a result, each radio base station transmits and receives at the same frame timing and adjacent radio base stations can transmit and receive the same frequency channel in the adjacent time slots.

In the present invention, instead of sending the timing pulses, synchronizing signal data are sent from a synchronized timing control station to base stations, where the received data are compared with the same synchronizing signal data held by the base stations.

SUMMARY OF THE INVENTION

The object of the present invention is to solve the problems encountered in the prior art by a new and different method from the disclosed measures.

The radio base station inter-station synchronizing circuit of the present invention includes:

synchronizing signal data reception/comparison means that receives synchronizing signal data sent from a synchronized timing control station provided within a TDMA digital mobile communication system and compares the received synchronizing signal data with the same synchronizing signal data held by a radio base station;

synchronizing signal timing correction means that subtracts from the timing of the received synchronizing signal data the line delay time from the synchronized timing control station to the radio base station when the received synchronizing signal data match with the same synchronizing signal data held by the radio base station;

synchronized timing holding means that holds synchronized timing that is corrected by the synchronizing signal timing correction means;

frame timing generation means that generates frame timing of a radio base station from synchronized timing pulses outputted from the synchronized timing holding means; and control means that monitors and controls the operation of each of the above means.

The above and other objects, features, and advantages of the present invention will become apparent from the following description based on the accompanying drawings which illustrate an example of a preferred embodiment of the present invention.

DESCRIPTION OF THE PREFERRED EMBODIMENTS

Figure 1:
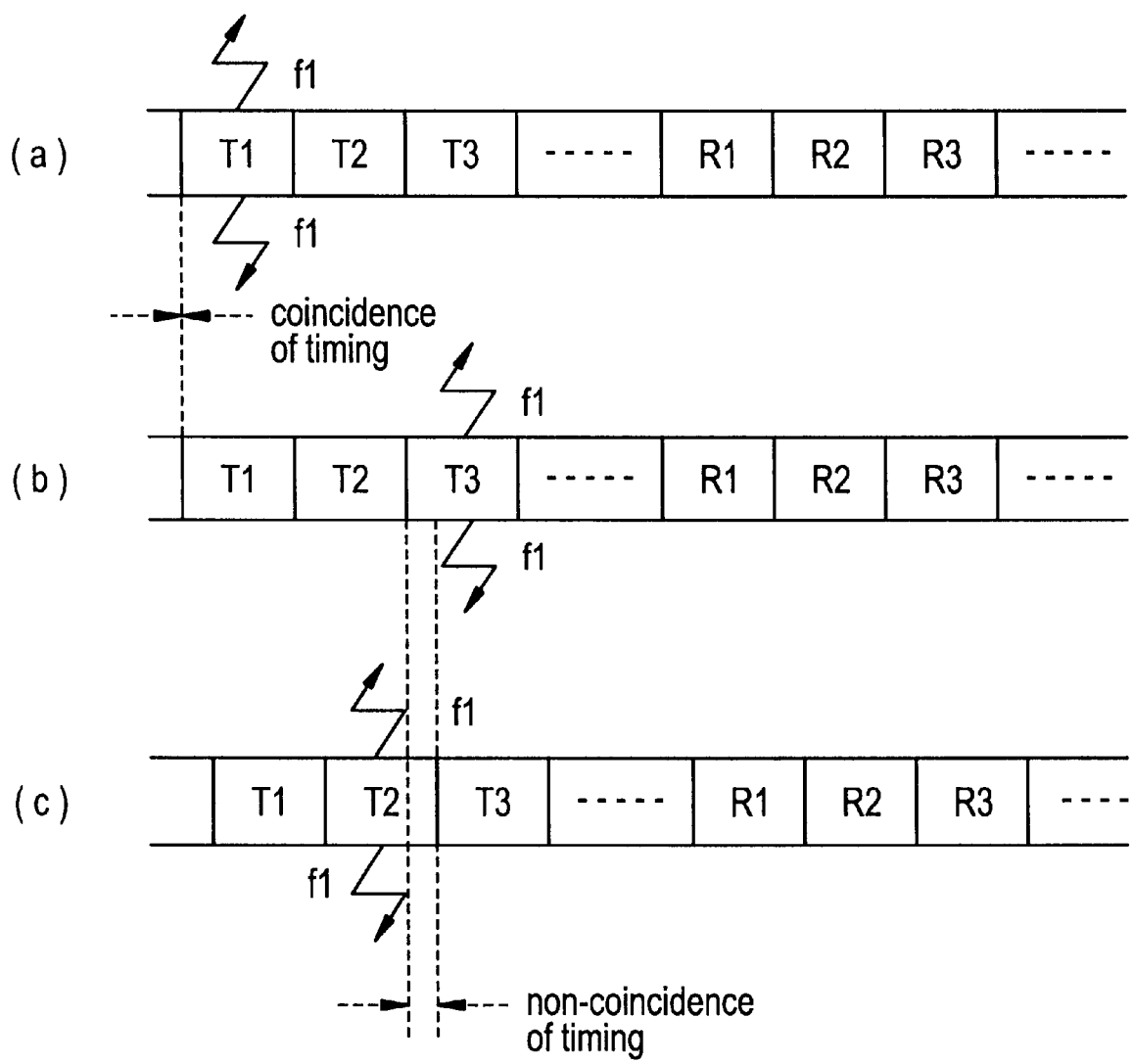
FIG. 1 illustrates coincidence and non-coincidence of synchronized timing between radio base stations; and (a), (b), and (c) show the configurations of time slots of transmitted and received radio waves of radio base stations A, B, and C, respectively.
Figure 2:
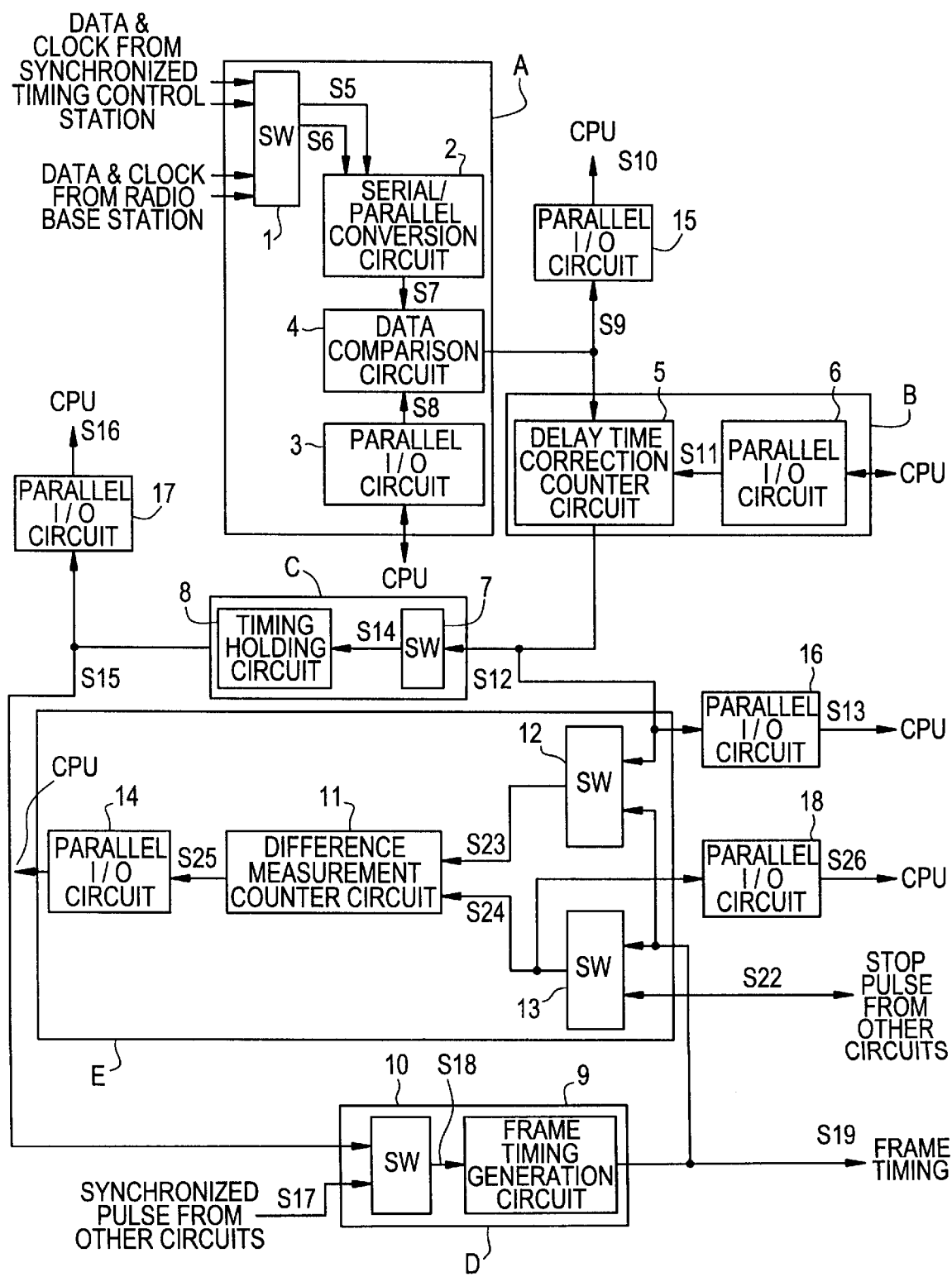
FIG. 2 is a block diagram showing the construction of an embodiment of the radio base station inter-station synchronizing circuit of the present invention.

Embodiments of the radio base station inter-station synchronizing circuit according to the present invention will next be explained with reference to the accompanying figures. FIG. 2 is a block diagram showing an example of the construction of a radio base station inter-station synchronizing circuit in a PHS radio base station according to the present invention.

The radio base station inter-station synchronizing circuit shown in FIG. 2 is connected to a synchronized timing control station (also referred to as a "timing control station" hereinbelow) provided in the PHS system by way of a ISDN-B channel, and generates TDMA frame timing of the station that is synchronized to the TDMA frame timing in the timing control station. In addition, switch SW1 switches synchronizing signal data and clock signals sent from the timing control station and synchronizing signal data and clock signals sent from an existing radio base station to an added radio base station provided at the same point as the existing radio base station.

The radio base station inter-station synchronizing circuit shown in FIG. 2 includes: synchronizing signal data reception/comparison unit A that receives synchronizing signal data sent from a synchronized timing control station according to a request by the radio base station, and compares whether the received synchronizing signal data match with the synchronizing signal data held by the radio base station; timing correction unit B that, when the above-described comparison results in a match, subtracts from the timing of the received synchronizing signal data the delay time of transfer from the timing control station to that radio base station; timing holding unit C that holds the corrected synchronized timing; frame timing generation unit D that generates frame timing of the radio base station based on the output pulse of timing holding unit C; phase difference measurement unit E that measures the phase difference between the timing signal outputted from timing correction unit B and the frame timing signal S19 outputted from frame timing generation unit D as necessary; and a control unit (CPU) that monitors and controls the operation of each of these components. The construction and operation of each of the above-described units will next be described.

Synchronizing signal data reception/comparison unit A includes a switch (hereinbelow abbreviated "SW") 1 that selects inputted synchronizing signal data and clock signals, serial/parallel (S/P) conversion circuit 2, parallel I/O circuit 3 that takes in and outputs synchronizing signal data S8, and data comparison circuit 4 that compares parallel data S7 and data S8.

Timing correction unit B includes delay time correction counter circuit 5 and parallel I/O circuit 6 that inputs delay time data and outputs to delay time correction counter circuit 5.

Timing holding unit C includes SW7 that operates when synchronizing to the timing of the timing control station after delay time correction, and timing holding circuit 8 that outputs timing pulse S15 in which corrected timing pulse S14 is counted.

Frame timing generation unit D includes frame timing generation circuit 9 that outputs regenerated frame timing S19, and SW10 that selects and outputs either synchronized timing pulse S15 or other synchronized pulse S17 from another circuit not shown.

Phase difference measurement unit E is made up of difference measurement counter circuit 11, switch SW12 and switch SW13 that, under the control of the CPU, selects start signal 23 and stop signal 24 to be conferred to difference measurement counter circuit 11, and parallel I/O circuit 14 which allows the CPU to read counter value S25.

The operation of the radio base station inter-station synchronizing circuit shown in FIG. 2 will next be explained, beginning with a case in which internal timing is generated.

According to the setting of the CPU, SW1 selects synchronizing signal data with clock signals sent from the timing control station by way of an ISDN-B channel, and this data S5 and clock signal S6 are inputted to S/P conversion circuit 2. S/P conversion circuit 2 outputs data S7, which has been converted from serial data to parallel data, to data comparison circuit 4. Parallel I/O circuit 3 takes in data S8 of a plurality of bits notified from the CPU, this data being the same data as that held by the radio base station and separately requested from the base station to the timing control station for sending to the base station, and outputs to data comparison circuit 4.

At data comparison circuit 4, data S7 from S/P conversion circuit 2 and data S8 from parallel I/O circuit 3 are compared, and data match signal S9 is outputted if the data are identical. This data match signal S9 is latched at parallel I/O circuit 15, i.e., this signal is monitored by the CPU and is released from the latched state through subsequent accessing by the CPU.

Delay time correction counter circuit 5, to which data match signal S9 is inputted, writes the delay time data to parallel I/O circuit 6 under the control of the CPU, and in addition, counts up at the rate of the high-speed clock signal from the value of counter initial value data S11. Delay time correction counter circuit 5 outputs timing pulse S12 corrected by subtracting the delay time of this count to parallel I/O circuit 16 at a prescribed timing. Parallel I/O circuit 16 latches the corrected timing pulse S12, and this signal is monitored by the CPU and released from the latched state through subsequent accessing by the CPU.

When synchronizing to the timing of the timing control station, SW7 is set to an ON state by the CPU, and the corrected timing pulse S12 passes through the switch and is inputted to timing holding circuit 8 as timing pulse S14. When timing pulse S14 is inputted, timing holding circuit 8 counts up at the rate of the high-speed clock signal and outputs the held data S15 for which timing has been corrected. Parallel I/O circuit 17 latches data S15 and notifies the CPU.

Either synchronized timing pulse S15 from timing holding circuit 8 or synchronized pulse S17 from another circuit (not shown) is selected by SW10 under the control of the CPU and outputted to frame timing generation circuit 9 as synchronized pulse S18. At frame timing generation circuit 9, frame timing S19, for which synchronization has been adjusted by resetting at the synchronized timing of synchronized pulse S18, is outputted to SW12, SW13 and other circuits of the base station.

This timing generation operation thus sets in parallel I/O circuit 6 the line delay time that is measured in advance between the timing control station and that radio base station. And the same synchronizing signal data as those sent from the timing control station according to the request by the radio base station are set to parallel I/O circuit 3, SW1 is switched to set S/P conversion circuit 2 to a state that allows reception, and the CPU monitors the state S10 of parallel I/O circuit 15.

Through this monitoring, the CPU sets SW7 to a "through" state when the state S10 signal becomes high level according to the output of data match signal S9. Subsequently, the state S13 of parallel I/O circuit 16 is monitored, and the CPU releases the "through" state of SW7 when the state S13 is high level and, further, switches SW10 and monitors the state S16 signal of parallel I/O circuit 17. Through this monitoring, frame timing generation circuit 9 generates frame timing when the state S16 signal becomes high level. In other words, a frame timing signal is outputted that matches with the standard synchronized timing of the timing control station side.

Next, when phase difference measurement is processed, either corrected timing pulse S12 from delay time correction counter circuit 5 or frame timing signal S19 from frame timing generation circuit 9 is selected at SW12 under the control of the CPU and outputted to difference measurement counter circuit 11 as counter start signal S23. Alternatively, either frame timing signal S19 from frame timing generation circuit 9 or stop pulse S22 (for example, an 8-KHz timing signal synchronized to ISDN system) from another circuit is selected at SW13 under the control of the CPU and outputted to difference measurement counter circuit 11 as counter stop signal S24.

Counter start signal S23 and counter stop signal S24 are latched at parallel I/O circuit 16 and parallel I/O circuit 18, respectively, thereby notifying the CPU. Difference measurement counter circuit 11 outputs the counter value S25 following a count stop to parallel I/O circuit 14, and counter value S25 is read by the CPU through parallel I/O circuit 14.

In the difference measurement process, therefore, the CPU next monitors the state S26 of parallel I/O circuit 18 when a signal indicating the state of parallel I/O circuit 16 becomes high level, and when this signal is high level, the CPU reads the parallel counter value S25 from parallel I/O circuit 14, thereby identifying the difference. In other words, linked switches SW12 and SW13 enable measurement of either the phase difference between corrected timing signal S12 outputted from delay time correction counter circuit 5 and frame timing signal S19 outputted from frame timing generation circuit 9 or the phase difference between frame timing signal S19 and a timing signal from another circuit.

It is to be understood, however, that although the characteristics and features of the present invention have been set forth in the foregoing description, the disclosure is illustrative only, and changes may be made in the arrangement of the parts within the scope of the appended claims.

What is claimed is:

1. A radio base station inter-station synchronizing circuit provided in a radio base station of a TDMA digital mobile communication system comprising:

synchronizing signal data reception/comparison means that receives synchronizing signal data sent from a synchronized timing control station provided within said system and compares the received synchronizing signal data with the same synchronizing signal data held by a radio base station;

synchronizing signal timing correction means that subtracts from the timing of said received synchronizing signal data the circuit delay time from said synchronized timing control station to the radio base station when said received synchronizing signal data match with the same synchronizing signal data held by the radio base station;

synchronized timing holding means that holds synchronized timing that is corrected by said synchronizing signal timing correction means;

frame timing generation means that generates frame timing of a radio base station from a synchronized timing pulse outputted from said synchronized timing holding means; and control means that monitors and controls the operation of each of the above-described means.

2. A radio base station inter-station synchronizing circuit according to claim 1 comprising phase difference measurement means that measures the phase difference between a corrected timing signal outputted from said synchronizing signal timing correction means and a frame timing signal outputted from said frame timing generation means.

3. A radio base station inter-station synchronizing circuit according to claim 1 or claim 2 wherein said TDMA digital mobile communication system is a Personal Handyphone System.

* * * * *